United States Patent
Boutet et al.

(10) Patent No.: US 7,064,893 B2
(45) Date of Patent: Jun. 20, 2006

(54) OPTICAL MICROSCOPE WITH MODIFIABLE LIGHTING AND OPERATING PROCESS OF SUCH A MICROSCOPE

(75) Inventors: Jérôme Boutet, Fontaine (FR); François Perraut, Saint-Joseph-de-Rivière (FR); Philippe Peltié, Saint-Paul-de-Varces (FR); Philippe Rizo, La Tronche (FR)

(73) Assignee: Commissariat a l'Energie Atomique, Paris (FR)

( * ) Notice: Subject to any disclaimer, the term of this patent is extended or adjusted under 35 U.S.C. 154(b) by 30 days.

(21) Appl. No.: 10/724,613

(22) Filed: Dec. 2, 2003

(65) Prior Publication Data

US 2004/0156101 A1   Aug. 12, 2004

(30) Foreign Application Priority Data

Dec. 13, 2002   (FR) .................................. 02 15819

(51) Int. Cl.
*G02B 21/06* (2006.01)
(52) U.S. Cl. ...................................... 359/385; 359/368
(58) Field of Classification Search ................ 359/363, 359/368, 385, 386, 388, 389
See application file for complete search history.

(56) References Cited

U.S. PATENT DOCUMENTS

| 4,323,299 A | 4/1982 | Roberts | 359/385 |
| 5,587,832 A * | 12/1996 | Krause | 359/385 |
| 5,708,526 A | 1/1998 | Stankewitz | 359/386 |
| 6,369,939 B1 * | 4/2002 | Weiss et al. | 359/387 |
| 6,687,052 B1 * | 2/2004 | Wilson et al. | 359/385 |
| 6,704,140 B1 * | 3/2004 | Richardson | 359/387 |

FOREIGN PATENT DOCUMENTS

| DE | 41 38 020 A1 | 4/1992 |
| DE | 195 37 606 A1 | 5/1996 |
| DE | 199 18 689 A1 | 11/2000 |
| EP | 0 911 667 A1 | 4/1999 |
| EP | 0 916 981 A1 | 5/1999 |

* cited by examiner

*Primary Examiner*—Alessandro Amari
(74) *Attorney, Agent, or Firm*—Oliff & Berridge, PLC

(57) ABSTRACT

An optical microscope is adapted for observation of several spots of an object by a modifiable optical transmission screen placed on the path of the optical beam and able to generate in the object plane a screen image coinciding substantially with the spots of the object. The modifiable optical transmission screen can comprise a matrix of mirrors, each of the mirrors presenting a first position enabling the light beam to be reflected to the object along the optical path and a second position enabling the light beam to be diverted from the optical path. Alternatively, the modifiable optical transmission screen can comprise a matrix of liquid crystal elements, each of the liquid crystal elements presenting a first transparent state, a second opaque state and, possibly, a third polarising state. The light source can be a light-emitting diode array.

9 Claims, 6 Drawing Sheets

OPTICAL MICROSCOPE WITH MODIFIABLE LIGHTING AND OPERATING PROCESS OF SUCH A MICROSCOPE

BACKGROUND OF THE INVENTION

The invention relates to an optical microscope suitable for observation of several spots of an object placed in an object plane of the microscope, comprising a light source, an objective and a light beam coming from the light source.

STATE OF THE ART

Observation by optical microscope (reading) of DNA chips, more particularly those presenting a strong contrast, requires suitable lighting techniques—it is in fact difficult to simultaneously image strongly luminous and weakly luminous zones of one and the same chip due to the limited range of the detectors. Either the detector amplification is sufficient to visualise the weakly luminous zones and the strongly luminous zones are saturated, or the detector amplification is correct for the strongly luminous zones and too weak to distinguish the weakly luminous zones from the background noise.

Examples of strongly contrasted objects are immunofluorescence blades whose bio-active spots presenting a predetermined fluorescence are surrounded by a very fluorescent hydrophobic coating. Certain DNA chips comprise fluorescent substances the purpose of which is to passivate the surfaces, to prevent mutual contamination of the bioactive spots or to insulate electrical contacts. The fluorescence of these substances is often greater than that of the bio-active spots. Thus, measurement of the fluorescence of the bio-active spots is impaired by the fluorescence of the zones surrounding the bio-active spots. This is the case for example of certain electro-polymerisation DNA chips or micro-well plates.

When measurement of reaction kinetics is concerned, prolonged lighting of certain zones may destroy the fluorescence, thus leading to disturbance of the results.

Different solutions exist to prevent contrast problems, for example the use of low-fluorescence support materials, protective coatings or shields. These solutions impose constraints which increase the cost of the experimental devices and which are not applicable in all cases. Another means consists in using detectors equipped with an anti-glare system. This solution presents limitations (non-linear response of the detector or low efficiency of the anti-glare system) and does not provide a solution to the problems relating to light diffraction by the collection optics, a phenomenon which spreads the light energy from the intense regions into the weakly luminous regions.

The alternative consists in using a point-by-point reading system (scanner) lighting of the surface is then performed by a small moving light point. This solution is very efficient when the remanence of the detector is low in comparison with the scanning rate and the contrast remains moderate. This solution is unsuitable when reading must be performed at the bottom of the wells as is the case for microplates or certain DNA chips, as the edges of the wells reduce the size of the light beam and therefore the efficiency of measurement at the level of the well bottoms. The mechanical and electronic components necessary to perform scanning are expensive and difficult to implement.

Object of the Invention

The object of the invention is to remedy these shortcomings and, more particularly, to provide a suitable structured lighting.

According to the invention, this object is achieved by the fact that the microscope comprises a modifiable optical transmission screen, comprising zones each presenting a first passing state and a second closed state, placed on the path of the optical beam upstream from the object and able to generate in the object plane an image coinciding substantially with the spots of the object to be observed.

According to a development of the invention, the modifiable optical transmission screen comprises a matrix of mirrors, each of the mirrors presenting a first position enabling the light beam to be reflected to the object and a second position enabling the light beam to be diverted from the optical path leading to the object.

According to another development of the invention, the modifiable optical transmission screen comprises a matrix of liquid crystal elements, each of the liquid crystal elements presenting a first transparent state and a second opaque state.

According to a preferred embodiment, the liquid crystal elements of the matrix of liquid crystal elements present at least a third polarising state.

According to a development of the invention, the light source is formed by an array of light-emitting diodes.

A further object of the invention is to achieve an operating process of an optical microscope comprising lighting of the object by emission of a series of light impulses at preset intervals.

BRIEF DESCRIPTION OF THE DRAWINGS

Other advantages and features will become more clearly apparent from the following description of particular embodiments of the invention given as non-restrictive examples only and represented in the accompanying drawings, in which.

DESCRIPTION OF PARTICULAR EMBODIMENTS

Figure 1:
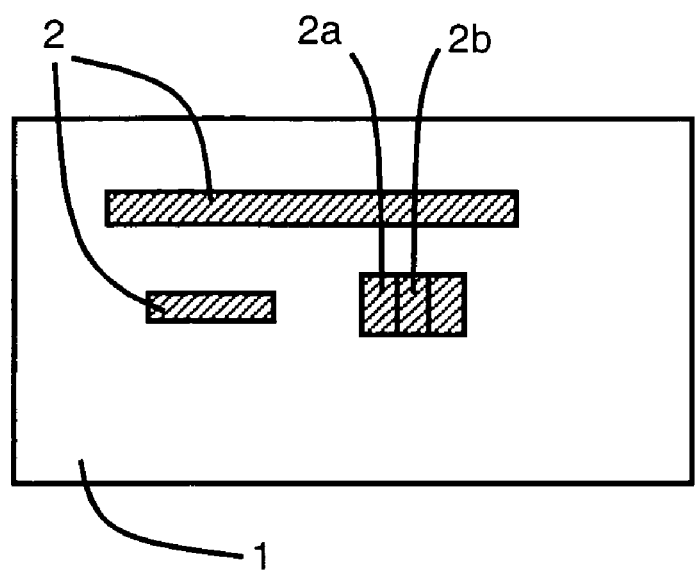
FIGS. 1 and 2 respectively represent an object and a screen suitable for the object.
Figure 2:
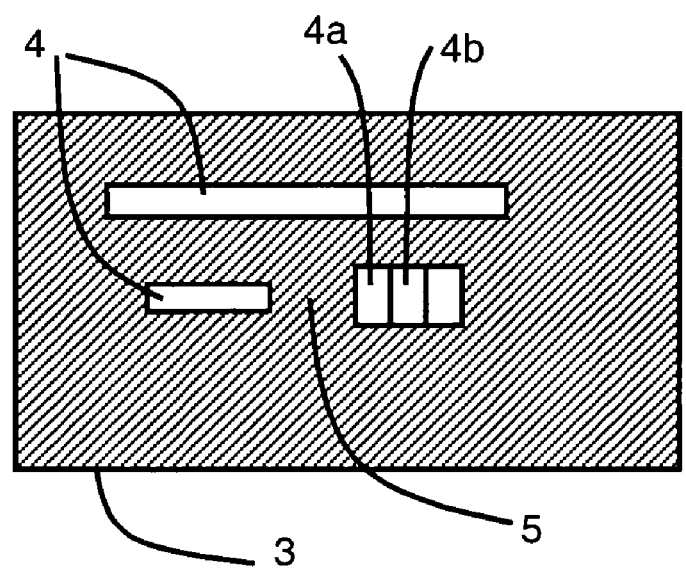

FIGS. 1 and 2 respectively represent an object 1 comprising several spots 2 to be observed by means of an optical microscope and a modifiable optical transmission screen 3 comprising zones each presenting a first passing state and a second closed state. In FIG. 2, zones 4 represent passing zones and zones 5 represent closed zones.

Figure 3:
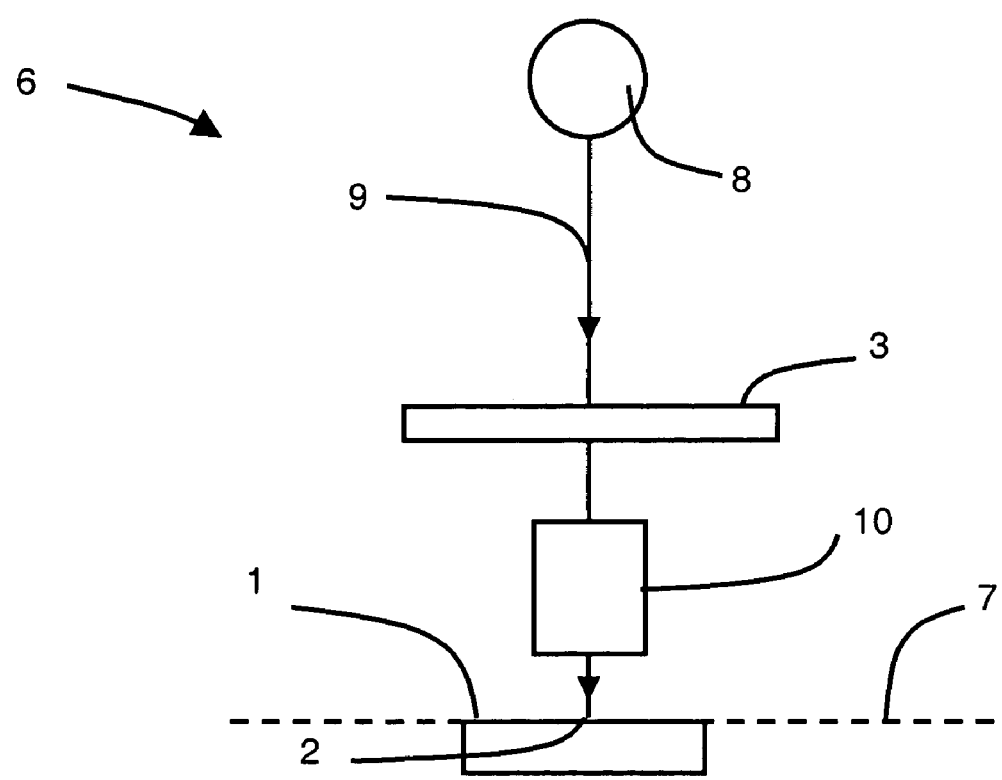
FIGS. 3 and 4 illustrate two particular embodiments of a microscope according to the invention.

FIG. 3 represents an embodiment of an optical microscope 6 suitable for observing several spots 2 of an object 1 placed in an object plane 7 of the microscope 6, comprising a light source 8 and a light beam coming from the light source 8 and passing along an optical path 9. A modifiable optical transmission screen 3 is placed on the optical path 9. The screen 3 is designed to generate an image in the object plane 7, the image coinciding substantially with the spots 2 of the object 1. An objective 10, arranged between the screen 3 and the object 1, enables the object 1 to be observed. In FIG. 3, the optical transmission screen 3 transmits light by transparency. Thus, in FIG. 3, the optical path 9 passes through the screen 3. The screen can be arranged in a lighting tube of the microscope.

Figure 4:
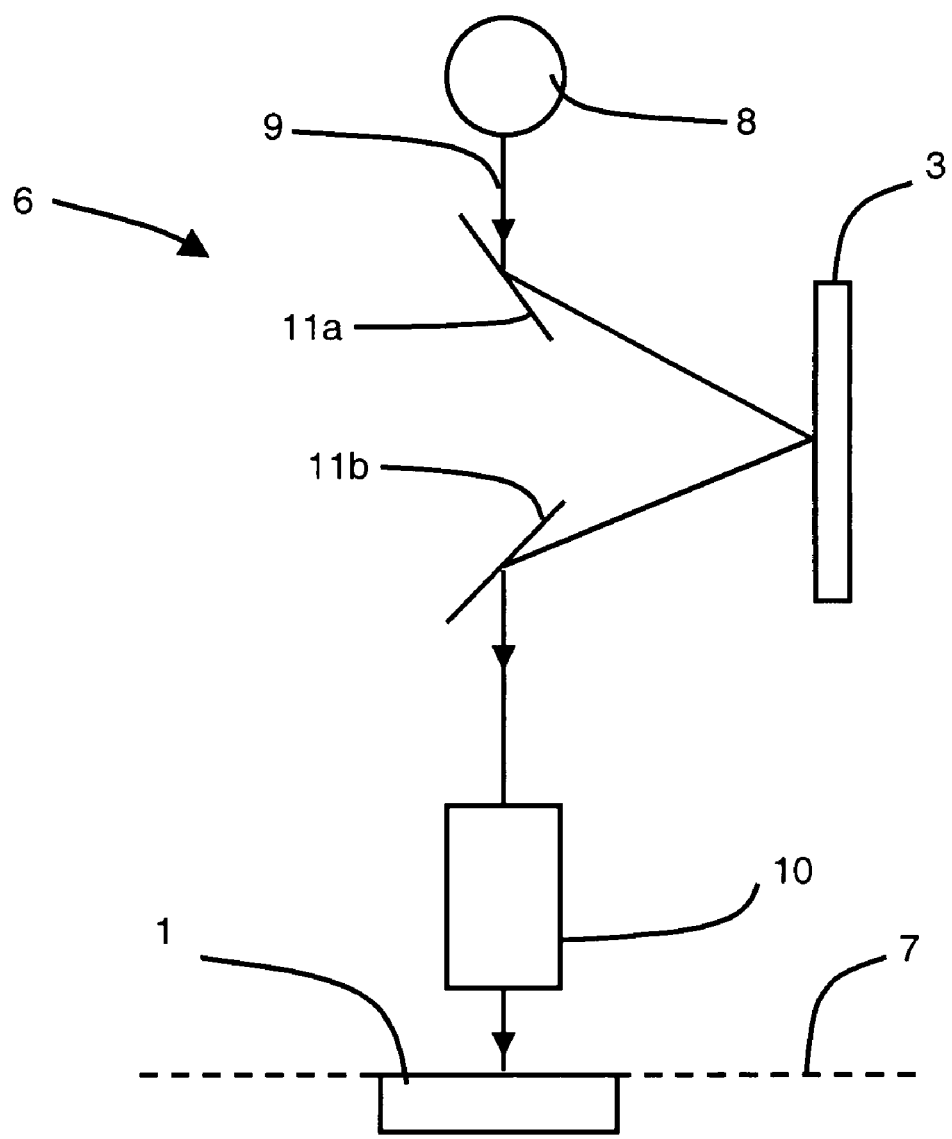

FIG. 4 illustrates another embodiment of an optical microscope 6 wherein the optical transmission screen 3 transmits light by reflection. Thus, the light beam emitted by the light source 8 is reflected by a first mirror 11a placed on the optical path 9. The beam reflected by the first mirror 11a is then reflected by the screen 3, arranged substantially perpendicularly to an axis going from the light source 8 to the object 1. The beam reflected by the screen 3 is then reflected by a second mirror 11b placed on the axis going from the light source 8 to the object 1, so as to reach the object 1 through the objective 10.

Figure 5:
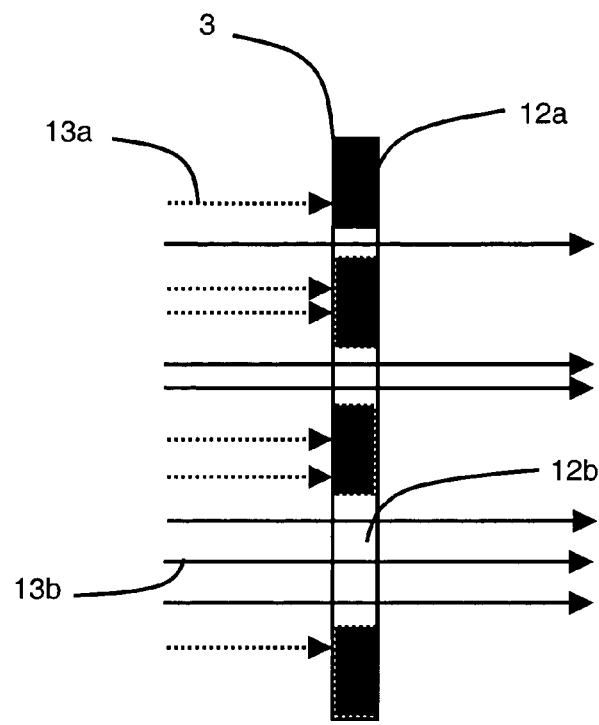
FIGS. 5 and 6 represent modifiable screens able to be used respectively in the microscopes of FIGS. 3 and 4.

FIG. 5 represents a modifiable optical transmission screen 3 able to be used in a transmission set-up, for example in a microscope according to FIG. 3. The screen comprises a matrix of liquid crystal elements 12, each of the liquid crystal elements 12 presenting a first transparent state and a second opaque state dependent on an applied command. The screen 3 is lit by light rays 13. A light ray 13a reaching an element 12a in an opaque state is blocked by the screen, whereas a light ray 13b reaching an element 12b in a transparent state is transmitted by the screen.

Figure 6:
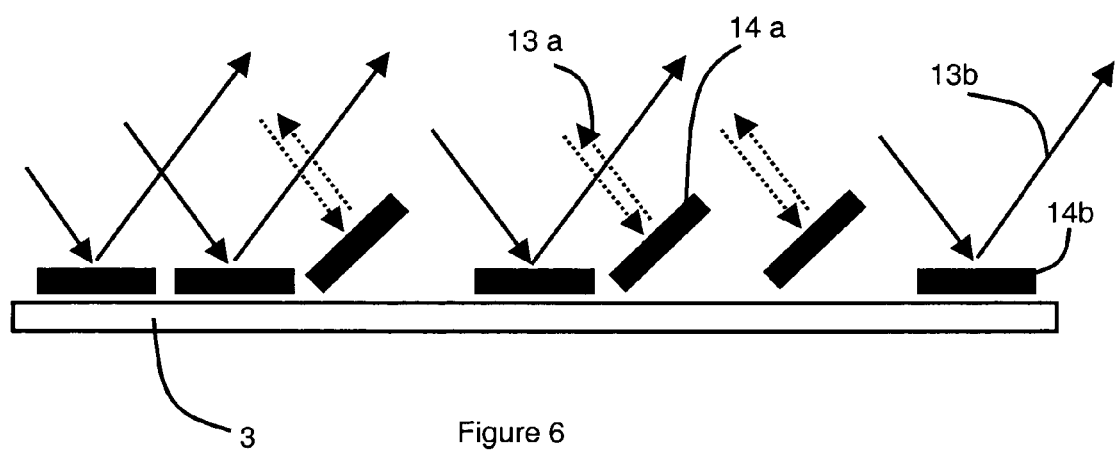

FIG. 6 represents a modifiable optical transmission screen 3 able to be used in a reflection set-up, for example in a microscope according to FIG. 4. The screen comprises a matrix of mirrors 14, each of the mirrors 14 presenting a first position able to reflect light to the object and a second position enabling the light to be diverted from the optical path 9. Thus, in FIG. 6, a light ray 13b reaching a mirror 14b in a first position (parallel to the plane of the screen 3 in FIG. 6) is reflected along an optical path enabling it to reach the object 1, whereas a light ray 13a reaching a mirror 14a in the second position (inclined with respect to the plane of the screen 3 in FIG. 6) is diverted from the optical path reaching the object 1.

Figure 7:
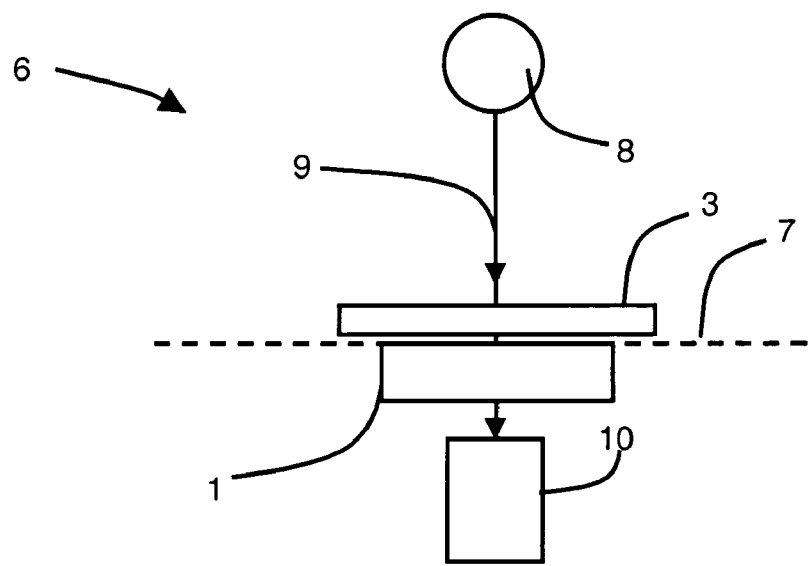
FIGS. 7 and 8 illustrate two particular embodiments of a microscope according to the invention.
Figure 8:
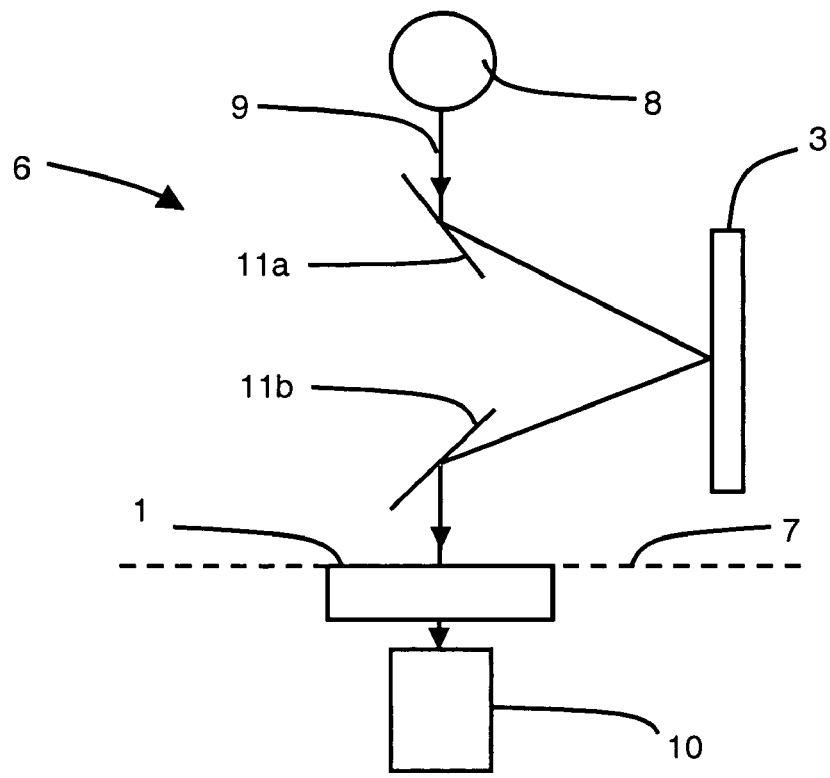

In a general manner, measurement can be performed with techniques for measuring transmission (absorption photometry), reflection (reflection photometry) and fluorescence. FIGS. 7 and 8 are alternative embodiments of the microscopes of FIGS. 3 and 4 wherein the object 1 is arranged between the objective 10 and the modifiable optical transmission screen 3. Thus the objective 10 measures the light transmission by the object 1. In the particular embodiment represented in FIG. 7, the modifiable optical transmission screen is arranged directly on the object 1.

Certain materials like liquid crystals have light polarisation properties. It is then possible to program the excitation polarisation direction for each spot 2 according to measuring criteria. In a particular embodiment of a microscope 6 comprising a liquid crystal-based optical transmission screen 3, the liquid crystal elements present at least a third polarising state. For example, the elements can present two orthogonal polarising states. Thus, certain spots 2a (FIG. 1) can be lit with a first polarisation direction through associated passing zones 4a (FIG. 2) and other spots 2b can be lit with a polarisation orthogonal to the first direction through associated passing zones 4b (FIG. 2). These polarised measurements enable for example long molecules to be differentiated from short molecules in DNA sequencing or mutation detection applications.

A microscope 6 according to the invention enables the lighting to be adapted to the object 1, in space and time, by programming the optical transmission screen 3.

To light an object 1 of known structure, the lighting must be suited to the orientation and the exact position of the object 1 in the object plane 7. To do this, a first image of the object 1, via a totally transparent screen 3, reveals the structure, the exact position and the orientation of the object. By comparison or correlation with the theoretical model of the known structure, the optical transmission of the screen 3 can be adapted automatically, by programming, to the exact position and the orientation of the object 1 so that the lighting corresponds to the lighting of the spots 2 to be observed.

To light an object 1 of unknown structure, an analysis is made on a first image of the object 1, via a totally transparent screen 3. Thus, the zones to be observed are noted and the optical transmission of the screen 3 is adapted to the structure thus marked so that the lighting corresponds to the lighting of the spots 2 to be observed. The zones 4 of the screen thus automatically take the shape of the spots 2 to be observed.

The modifiable optical transmission screen 3 also enables the image of the screen 3 to be changed during a measurement. It is thus possible to follow a kinetics more reliably eliminating photo-extinction of a marker. In the case of an object 1 structured in dots containing molecules (oligonucleotides, complementary of a given sequence, specific antibodies of an antigen, etc.), spots 2a and 2b (FIG. 1) of the reactional dots are not lit simultaneously, but a first spot 2a is lit first and a second spot 2b is then lit, respectively by means of corresponding zones 4a and 4b (FIG. 2) of the screen 3. Consequently, each measurement only takes the lit spot into account. Photo-extinction is thus limited and the information collected is specific of the kinetics of the reaction to be studied. Switching the lighting from the first spot 2a to the second spot 2b can be performed after a certain number of readings when the user considers that the first spot 2a is no longer usable.

Another application of a modifiable optical transmission screen 3 is lighting of different spots 2 during different time periods. For example, a first spot 2a of the object 1 (FIG. 1) can be lit for a shorter time than a second spot 2b of the object 1. To do this, the screen 3 is closed in the zone 4a corresponding to the first spot 2a of the object 1 whereas the screen 3 remains open in the zone 4b corresponding to the spot 2b, so as to light the second spot 2b. The advantage of such a method is to enable a broad detection range in spite of a saturating detector. For example, two spots (2a and 2b) having very different emission levels can be situated on an object 1. Spot 2a emits an equivalent of 200 GL (grey level), spot 2b emits the equivalent of 20,000 GL and the detector saturates at 255 GL. Spot 2b has to be integrated for a time one hundred times shorter than spot 2a. At the beginning of measurement, the screen 3 is transparent for the spots 2a and 2b. If the measurement to obtain a good signal from spot 2a has to last 60s, the zone 4b associated with spot 2b is specifically blanked off after 0.6s to prevent the detector from saturating.

Today, screen resolution can be up to 1024×768 elementary pixels for liquid crystal matrices. Micro-mirror matrices enabling light to be reflected selectively according to an applied command can achieve a resolution of the same order.

The invention is not limited to the particular embodiments represented above. In particular, the optical path going from the light source 8 to the object 1 can comprise a semi-reflecting mirror or a wavelength separating blade arranged between the screen 3 and the object 1.

The light source 8 can, in known manner, be formed by a halogen lamp or an arc lamp. However, these types of light sources present many light losses and have high purchasing and operating costs. Moreover, lasers have the drawback of supplying a coherent light which generates diffraction patterns, which deteriorates the spatial homogeneity of lighting of the object.

Figure 9:
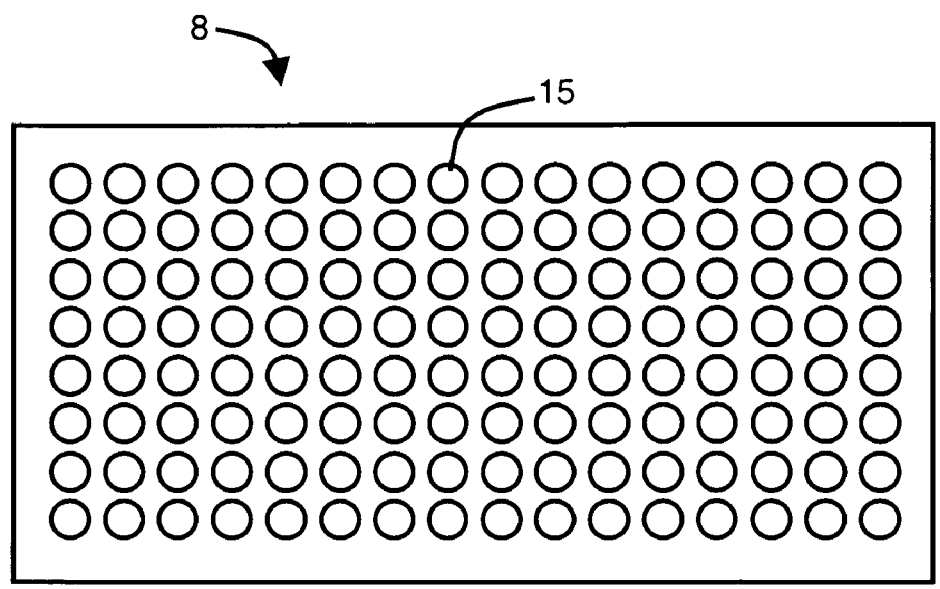
FIG. 9 represents a particular embodiment of a light source constituted by a light-emitting diode array.

Advantageously, the light source 8 is formed by an array of light-emitting diodes 15, represented in FIG. 9. In the case of an object 1 structured in dots, each light-emitting diode 15 can be associated to a dot. For example, the object can comprise eight rows of sixteen dots and the array can comprise eight rows of sixteen diodes as represented in FIG. 9. In most applications, the power of a single light-emitting diode 15 is sufficient for lighting a dot.

Preferably, the array of light-emitting diodes 15 comprises light-emitting diodes 15 of different colours. For example, the array can comprise four series of diodes, respectively blue, green, orange and red. Several arrays of different light-emitting diodes 15 can be arranged on a support, in the form of a wheel, enabling the required array to be placed selectively in place of the light source 8.

Figure 10:
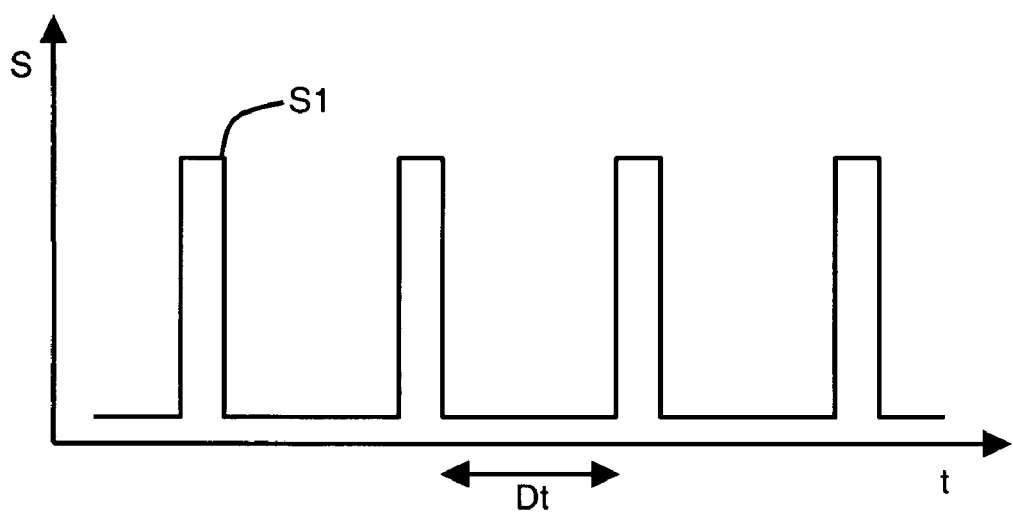
FIG. 10 illustrates a particular embodiment of an operating process of the microscope according to the invention.

Operation of the diodes in continuous lighting is not indispensable, in particular for fluorescence measurements. The fluorescent molecules in fact simply have to be lit for a short time. Then the light source can be switched off during an interval corresponding approximately to the relaxation time of the molecules. Thus, as represented in FIG. 10, an operating process of an optical microscope according to the invention comprises lighting S of the object 1 by emission of a series of light impulses S1 at preset intervals Dt. The duration of an impulse S1 can be about a few µs, whereas the interval Dt can be substantially longer, for example one ms. The fluorescence signal is preferably acquired during an integration time of about one second in order to accumulate a multitude of cycles each comprising a light impulse S1.

The invention claimed is:

1. An optical microscope suitable for observing several spots of an object placed in an object plane of the microscope, comprising:
   a light source;
   an objective; and
   a modifiable optical transmission screen comprising zones each presenting a first passing state and a second closed state, the modifiable optical transmission screen being placed on an optical path upstream from the object and that generates in the object plane an image of the modifiable optical transmission screen coinciding substantially with the spots of the object to be observed, the spots to be observed corresponding to a structure of the object.

2. The microscope according to claim 1, wherein the modifiable optical transmission screen comprises a matrix of mirrors, each of the mirrors presenting a first position enabling a light beam from the light source to be reflected to the object and a second position enabling the light beam to be diverted from the optical path leading to the object.

3. The microscope according to claim 1, wherein the modifiable optical transmission screen comprises a matrix of liquid crystal elements, each of the liquid crystal elements presenting a first transparent state and a second opaque state.

4. The microscope according to claim 3, wherein the liquid crystal elements of the matrix of liquid crystal elements present at least a third polarising state.

5. The microscope according to claim 1, wherein the modifiable optical transmission screen is arranged directly on the object.

6. The microscope according to claim 1, wherein the object is arranged between the objective and the modifiable optical transmission screen.

7. The microscope according to claim 1, wherein the light source is formed by an array of light-emitting diodes.

8. The microscope according to claim 7, wherein the array of light-emitting diodes comprises light-emitting diodes of different colors.

9. An operating process of the optical microscope according to claim 7, comprising lighting of the object by emission of a series of light impulses at preset intervals.

* * * * *